United States Patent [19]

Pashley

[11] Patent Number: 5,387,958
[45] Date of Patent: Feb. 7, 1995

[54] ELECTRO-OPTICAL CONTROL OF LIGHT ATTENUATION IN THE OPTICAL PATH OF A CAMERA

[75] Inventor: Raymond F. Pashley, Chino Hills, Calif.

[73] Assignee: Sony Electronics, Inc., Park Ridge, N.J.

[21] Appl. No.: 906,687

[22] Filed: Jun. 30, 1992

[51] Int. Cl.6 .............................................. G02F 1/00
[52] U.S. Cl. ................... 354/227.1; 348/224
[58] Field of Search ............... 354/227.1, 430, 271.1; 358/228; 348/224

[56] References Cited

U.S. PATENT DOCUMENTS

| | | | |
|---|---|---|---|
| 3,270,639 | 9/1966 | Windsor | 354/227.1 |
| 3,433,139 | 10/1966 | Beyen et al. | 354/227.1 |
| 3,476,029 | 11/1969 | Schreckendgust | 354/227.1 |
| 4,054,890 | 10/1977 | Shimomura | 354/227 |
| 4,480,269 | 10/1984 | Yoshida et al. | 358/209 |
| 4,527,189 | 7/1985 | Ooi et al. | 358/29 |
| 4,554,587 | 11/1985 | Ooi et al. | 358/228 |
| 4,591,253 | 5/1986 | Hecker et al. | 354/227.1 |
| 4,739,411 | 4/1988 | Bolton | 358/227 |
| 4,755,869 | 7/1988 | Tanaka | 358/60 |
| 4,887,121 | 12/1989 | Pritchard | 354/430 |
| 5,030,985 | 7/1991 | Bryant | 354/432 |
| 5,073,013 | 12/1991 | Sonehara et al. | 359/63 |
| 5,075,798 | 12/1991 | Sonehara et al. | 359/490 |
| 5,172,146 | 12/1992 | Wooldridge | 354/21 |
| 5,191,408 | 3/1993 | Takahashi et al. | 358/49 |

FOREIGN PATENT DOCUMENTS 2630593 2/1977 Germany .
1035705 8/1981 Japan .
1144018 6/1989 Japan .

OTHER PUBLICATIONS

Dan McCosh, "Coming for Cars: Smart Glass", *Popular Science*, Apr. 1991, pp. 89–91, 100.

Primary Examiner—Michael L. Gellner
Assistant Examiner—Nicholas J. Tuccillo
Attorney, Agent, or Firm—Irell & Manella

[57] ABSTRACT

A camera which has an electrochromic neutral density filter. The neutral density filter is placed in the optical path of the camera. The filter changes the amount of light which may pass through it when a voltage is applied thereby regulating the amount of light which may enter the camera. By controlling the amount of light which passes through the electrochromic filter, the camera operator can control incoming light to maintain desired density (depth of field). In another embodiment, a color video camera has a color separator which separates the light into red, green and blue components. Electrochromic filters are placed between the color separator and red and blue light sensors of the camera to control the amount of light reaching the red and blue sensors. By controlling the amount of light which passes through the electrochromic filters, the camera operator can control incoming light to correct color.

65 Claims, 2 Drawing Sheets

ELECTRO-OPTICAL CONTROL OF LIGHT ATTENUATION IN THE OPTICAL PATH OF A CAMERA

BACKGROUND OF THE INVENTION:

(1) Field of the Invention

The present invention relates to camera systems, and more particularly, to a method and apparatus to control color correction and provide neutral density control of the incoming light through the optical path.

(2) Art Background

Cameras are well known and widely used. There are many types of cameras. While the principle of operation varies, each type of camera records an image formed by rays from the electro-magnetic spectrum which is typically the range of the electro-magnetic spectrum that can be perceived by the human eye. Generally, a camera is a closed box which contains a lens, or combination of lenses, and a sensor which receives and record rays of light passing through the lens, thus fixing an image of an object in focus. One kind of camera records an image chemically on a sensitized plate or film. Another kind of camera records an image electronically by generating a video signal from a pickup tube (e.g. iconoscope, Orthicon) or solid-state counterpart (e.g. charge-coupled image sensor (CCD)). To avoid unnecessarily confusing the presentation of the invention, a "film" camera will refer to the former type of camera and a "video" camera will refer to the latter.

Cameras can also be classified by whether they capture a single image at a time or depict motion by capturing a sequential series of images. Still cameras capture a single image on film and video-store cameras capture a single video image. Motion picture cameras store a series of images on film and television cameras use video to capture a series of images.

The light-gathering ability of a camera is determined by the diameter of the lens. The larger the lens diameter, the greater the amount of light falling on the target that enters the camera. An iris in the lens varies the opening for light to enter the lens. The light input is controlled by controlling the iris. One important factor affected by the lens opening is the depth of field, the distance between the object in focus closest to the camera and that object at a distance farthest from the camera while remaining in focus.

At wide lens openings, the depth of field is poorest. If the depth of field is to be increased, the lens must be "stopped down" (i.e. the iris aperture diameter reduced) and the amount of light on the subject increased to compensate for the smaller aperture. If the lighting level remains constant, still picture photographers can increase the exposure time, trading exposure speed for depth of field, provided there is little or no movement in the picture. However, the exposure time is fixed at the frame rate for both motion picture and television cameras.

In any type of camera, the amount of light reaching the sensor when the aperture size changes can be controlled by neutral density filters. Neutral density filters decrease light transmission uniformly across the visual spectrum. Neutral density adjustment is commonly accomplished by installing gray filters of fixed attenuation values in the optical path of the camera. The neutral density filters are installed singularly, or a group may be used in a rotary cassette. Neutral density filters are also commonly used in film cameras to down-rate the film speed when a camera loaded with fast film is suddenly used to photograph a brightly lit scene.

Human vision corrects for differences in illumination quite automatically. A shirt, for example, is accepted as white both indoors under incandescent lighting and outdoors under natural light. Film and video cameras are not self-adjusting in that sense and color correction must be provided to compensate for the change in color caused by a change in illumination.

A color television camera can be thought of as three cameras in one housing, one for each primary color: red, green and blue. A typical studio camera contains three pickup tubes, one for each primary color. An optical separator, behind the main lens (the taking lens), breaks incoming light into its red (R), green (G) and blue (B) values. Separate preamplifiers and processors handle these R, G and B signals.

Optical separation of the light into its three components may be achieved in different ways. In a simple optical separator with color filters, incoming light from the taking lens is split into three light paths, one per pickup tube, by partially silvered mirrors. The mirrors pass part of the light and reflect the remainder. In front of each pickup tube is an optical filter. These filters are selected to pass a narrow band of wave lengths centered on the red, green and blue primary signals. The filters block unwanted light. The blue filter, for example, passes blue frequencies but blocks red and green frequencies. However, there is excessive light loss in a simple optical separator with color filters.

Dichroic mirrors solve the light-loss problem in an optical separator because they pass certain wave length bands and reflect others. In a dichroic mirror optical separator, the first mirror reflects blue light, but passes the remainder. The blue light is totally reflected from a front-silvered mirror into a relay lens, which forms an image of the blue components of the picture on the target plate of the blue pickup tube.

The light that passes through the first dichroic mirror then impinges on a second mirror. Here the red component is reflected, and the remainder passes through. What is left is white minus red and blue, which is essentially green. Very little of the red-green-blue component is lost. The light that reaches the red pickup tube is a very large fraction of the total red light leaving the taking lens.

A variation of the dichroic mirror system makes use of prisms instead of mirrors. In this system compound series of critically ground and coupled glass prisms separate incoming light into red, green and blue components. There is no glass-to-air interface within the prism system, resulting in less light loss as a result of scattering. Thus prism systems offer greater light sensitivity. For this reason, the use of prisms for optical separation is generally preferred over the use of mirrors.

A color TV camera is considered balanced for a particular reference white when a neutral white card is illuminated with the lighting to be used for shooting and the red, green and blue channels provide equal output levels.

If the light source is changed, such as in going from the studio to an outdoor setting, the camera must be rebalanced. The gains of the three channels must be readjusted to provide the same output on the white card with a new source of light (in this case, the sun). The usual practice is to hold the gain of the green channel fixed and alter the red and blue gain to match the red and blue amplitude to the green amplitude. However, increasing gain, especially blue gain, produces a noisy picture which may be unacceptable.

Color correction can also be accomplished in any color camera by installing color band pass filters of fixed frequency in the optical path to reduce the amount of light of a particular frequency band. The color band pass filters may be installed singularly, or a group may be used in a rotary cassette.

Cameras that use optical filters to control neutral density light transmission and color correction are limited in the corrections which can be made. The corrections may only be made in discrete increments based upon the number of filters available. Therefore, while film motion picture cameras can maintain continuous control of depth of field, a color television camera is limited to a discrete number of field depths for a given light level. Furthermore, only a discrete number of light levels may be used with a color television camera due to the limited number of color correction filters available at any given time. Also, the process for determining the proper filter or series of filters to use can be a cumbersome and time consuming task. To ease the process, some cameras are provided with a rotary cassette containing a number of filters. To change a filter, the cassette is simply rotated to position a new filter. However, the number of filters contained in each cassette is limited, limiting the range of filtering that can be performed. Moreover, even when filters are contained in a rotary cassette, there is a delay as the filters are changed.

SUMMARY OF THE INVENTION

It is therefore an object of the present invention to achieve continuously variable neutral density control of incoming light through the optical path of a camera.

It is a further object of the present invention to achieve continuous control of the depth of field of a color television camera, thus matching the capability of a color motion picture film camera.

It is an object of the present invention to achieve continuous control of the adjustment of color correction in a color television camera, thus maintaining proper color balance.

It is an object of the present invention to provide a camera that eliminates the necessity to interchange gray filters to achieve neutral density adjustment.

It is also an object of the present invention to provide a color television camera that eliminates the necessity to interchange color band pass filters for color correction.

The present invention employs electrochromic filters to provide electro-optical control of light attenuation in the optical path of a camera. Electrochromic glass darkens when a current passed into an electrolyte through a copper grid prompts a chemical reaction in an ultra-thin tungsten oxide film layer. The amount of darkening can be controlled by varying the electrical voltage applied to the electrolyte.

In the present invention, an electrochromic neutral density filter controls the amount of light entering a camera. Electrochromic filters are also placed between the color separator and the red and blue sensors of a color video camera. The red and blue light electrochromic filters provide color correction by controlling, respectively, the amount of red light that reaches the red sensor and the amount of blue light that reaches the blue sensor.

BRIEF DESCRIPTION OF THE DRAWINGS

The objects, features and advantages of the electro-optical control of light attenuation in the optical path of a camera of the present invention will be apparent from the following detailed description of the preferred embodiment in which.

DETAILED DESCRIPTION OF THE INVENTION

An apparatus and method is disclosed for electro-optical control of light attenuation in the optical path of a camera. In the following description, for the purposes of explanation, specific devices, signals and data structures are disclosed in order to more thoroughly understand the present invention. However, it will be apparent to one skilled in the art that the present invention may be practiced without the specific details. In other instances, well-known circuits and data structures are not disclosed herein to avoid obscuring the present invention unnecessarily.

In the present invention, electro-optical control of light attenuation in the optical path of a camera is achieved through the use of filters made of electrochromic glass. Electrochromics are a group of chemicals that can be induced to change color when an electric current is applied. Most electrochromic reactions are stable once the change has taken place, meaning they remain in the color state even after the current is switched off. The higher the voltage applied, the darker the color.

Figure 1:
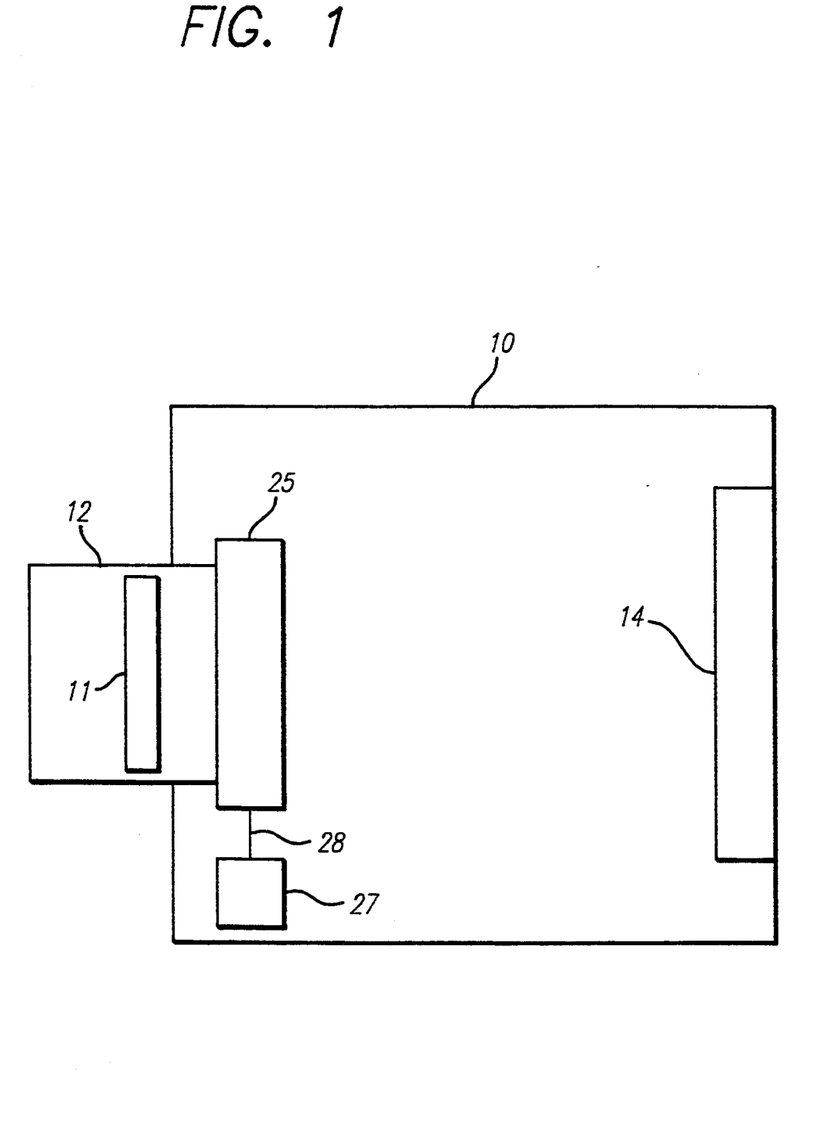
FIG. 1 illustrates a camera with an electrochromic neutral density filter.

An embodiment of a camera 10 which employs an electrochromic neutral density filter is depicted in FIG. 1. Light enters the camera 10 through a lens 12 and which focuses the light onto sensor 14. If camera 10 is a film camera, sensor 14 would be a sensitized plate or film. If, on the other hand, camera 10 is a video camera, sensor 14 would typically be a pickup tube (e.g. iconoscope, Orthicon) or solid-state counterpart (e.g. charge-coupled image sensor (CCD)).

Lens 12 contains an adjustable diameter aperture iris 11. Adjustment of the aperture of iris 11 varies the depth of field of the camera 10. The diameter of the aperture of iris 11 can be varied over a virtually continuous range. The smaller the diameter of the aperture, the greater the depth of field of the camera 10. However, for a given ambient light level, increasingly more light passes into the camera 10 through iris 11 as the diameter of the aperture of iris 11 is increased.

Light from lens 12 passes through neutral density filter 25 and strikes sensor 14. Neutral density (ND) filter 25 is made of electrochromic glass, preferably an electrochromic glass manufactured by Gentex Corporation of Zeeland, Mich. In the Gentex electrochromic glass, a copper grid is surrounded by an electrolyte which is sandwiched between two pieces of glass. One of the two pieces of glass has an ultra-thin tungsten oxide film layer next to the electrolyte. A current passed into the electrolyte through the copper grid prompts a chemical reaction in the tungsten oxide film layer, thereby darkening the glass. The voltage applied controls the darkening. The darkening of the glass can be reversed by reversing the direction of the current.

The amount of light which may pass through the Gentex glass (transmittance) normally varies from 5%, when the glass is at its darkest, to 80%, when it is at its lightest. However, the transmittance range of the glass can be varied to as low of a range as 1%–70%. The darkening is readily controlled by varying the voltage. The change takes approximately ten seconds for the entire range transition. However, most of the change occurs as soon as a voltage is applied. The glass has a good optical quality, permitting an almost even transmission of light across the visible spectrum (neutral density).

A direct current from ND filter power supply 27 is applied to the ND filter 25 over ND control line 28. Application of the current from ND filter power supply 27 will cause the ND filter 25 to darken, thereby reducing the amount of light which reaches sensor 14. Conversely, reversing the current flow direction from ND filter power supply 27 will cause the ND filter 25 to lighten, thereby increasing the amount of light which reaches the sensor 14. The voltage applied to the ND filter 25 determines the transmittance of the glass. Within the operating range of the glass, the higher the voltage, the darker the glass becomes.

The amount of light entering the sensor 14 can be kept constant as the aperture diameter of iris 11 is increased by applying the proper current to darken ND filter 25 sufficiently to offset the increased light which enters through the larger diameter aperture of iris 11. Later, when the diameter of the aperture of iris 11 is decreased, the current applied to ND filter 25 can be reversed, thereby lightening ND filter 25 to maintain constant the light level which reaches sensor 14. Hence, the diameter of the aperture of iris 11 can be changed continuously and the darkness of ND filter 25 can also be changed continuously to maintain a constant light level which reaches sensor 14 as the diameter of the aperture of iris 11 is varied. Each change in aperture diameter of iris 11 corresponds to a change in depth of field for camera 10. Therefore, the depth of field of camera 10 can be varied over a virtually continuous range in a variety of lighting environments.

Control of the current to the ND filter 25 to provide various darkness settings for the ND filter 25 could be accomplished using analog, digital or automatic control. Each of the control methods are well known in the art. Therefore, to avoid unnecessarily obscuring the present invention, each method will only be discussed to disclose how it would be used to control ND filter 25.

In an analog control scheme, the camera operator would adjust a control knob on a potentiometer, much like adjusting the volume on a radio, to compensate for the change in light entering the camera 10 as the aperture diameter of iris 11 varied. A dial on the potentiometer would be calibrated for common light-level and aperture diameter combinations to facilitate selecting the proper setting. The control knob of the potentiometer could also have detents at various common level settings to provide for uniform adjustments.

Techniques well known in the art could be employed to adjust the potentiometer. For example, for a film camera, the operator would look at a light meter within the camera and determine if the adjustment is sufficient to bring the image within the proper range for the given film speed and exposure time.

For a video camera, the operator would focus the camera on a reference white card and adjust the potentiometer until the video output signal reached a proper value. Reference white for television is specified as a color temperature of 3200 degrees Kelvin. This is a redish white, of incandescent tungsten lamps. When a color camera is set up, it is aimed at a card specified as reference white. The R, G and B video outputs of the camera are adjusted so that the amplitude of the R, G and B video outputs are equal to each other. Just as the combination of the primary colors red, green and blue, in equal amounts forms white, so does the combination of R, G and B signals in equal amounts. The amplitude of the R, G and B signals depends upon the particular standard to which the video signal must conform. Composite video can be measured in IRE (Institute of Radio Engineers) units. The total IRE scale includes 140 units, with 100 up and 40 down from zero. The peak-to-peak composite video signal includes 140 IRE units. Peak white goes to approximately 100 IRE units, which for the NTSC (National Television Systems Committee) standard corresponds to the range of zero to 714 millivolts. Thus, for a NTSC video signal, the electrochromic filter would be adjusted until the G video output measured 714 millivolts. Then, an optical color correction filter would be positioned in the light path of the camera to balance the R and B video outputs so that the R and B video outputs each match the amplitude of the G video output. Alternately, instead of using the optical color correction filter, the R and B video outputs could be amplified or attenuated by an automatic gain control white balancing circuit of a type well known in the art to match the amplitude of the G video output.

In a digital control scheme, the continuous range of the potentiometer would be replaced with a discrete number of settings. The number of settings would depend upon the degree of resolution required to properly adjust the neutral density filter. For an 8-bit resolution, there would be 256 possible transmittance settings for ND filter 25. If the resolution were increased to 10-bits, there would be 1024 possible settings. The camera operator would select a desired setting by entering a number corresponding to the desired darkness setting for the ND filter 25. One or more memory registers could be used to store commonly used darkness settings. The camera operator could then retrieve a desired commonly used setting, instead of selecting the darkness setting directly.

Automatic control of the darkness of the ND filter 25 could be achieved by using a look-up table to provide the necessary ND control current level, direction and duration to compensate for common light-level and/or aperture diameter changes. Alternately, ND filter power supply 27 could contain a photovoltaic cell that would sense the level of light entering the camera. The ND filter power supply 27 would adjust the current and voltage supplied to ND filter 25 until a desired light level was measured by the photovoltaic cell.

It will be appreciated by one skilled in the art that there are numerous alternate embodiments of the present invention. For example, ND filter 25 can be placed anywhere in the optical path before the sensor 14. Therefore, ND filter 25 could be placed between lens and iris 11. For that matter, ND filter 25 could be a separate unit which would be attached outside the camera 10 over lens 12.

Furthermore, if one filter alone cannot achieve the desired darkness, multiple ND filters 25 could be placed in the optical path. Alternately, multiple ND filters 25 containing electrochromic glass with different transmittance ranges could be selected and placed in the optical path as lighting needs varied. In situations where there is little light, ND filter 25 could be removed from the optical path to permit all possible light to reach sensor 14.

Several advantages can be attained by using a neutral density filter in the manner of the present invention. First, because the transmittance of the electrochromic ND filter can be varied electrically, there is no need to physically substitute ND filters to adjust for changing light conditions. Therefore, the conventional ND filters and the cassette which contains them can be eliminated from the camera, and the number of moving parts in a camera can be reduced. Secondly, the electrochromic filter changes transmittance rapidly, which means that the delay which ensues as conventional ND filters are changed will be eliminated. Thirdly, an electrochromic ND filter provides virtually continuous control of the amount of light entering the camera. Previous methods limited the number of ND adjustments to a discrete set which depended on the number of conventional ND filters available. Virtually continuous control of the transmittance of the ND filter permits the camera operator to adjust depth of field in a virtually continuous manner. This is the case even for video cameras which, prior to the present invention, were limited to discrete depth of field adjustments. Therefore, the present invention permits video camera operators to achieve artistic depth of field effects which were not possible prior to the present invention.

It will also be obvious to one skilled in the art that electrochromic ND filters can be used in a camera to perform any function for which a conventional ND filter could be used. Therefore, an electrochromic ND filter could be used, for example, to decrease the amount of light entering a film camera to compensate for the fact that the film camera contains a faster film than would normally be used under a given set of lighting conditions.

Figure 2:
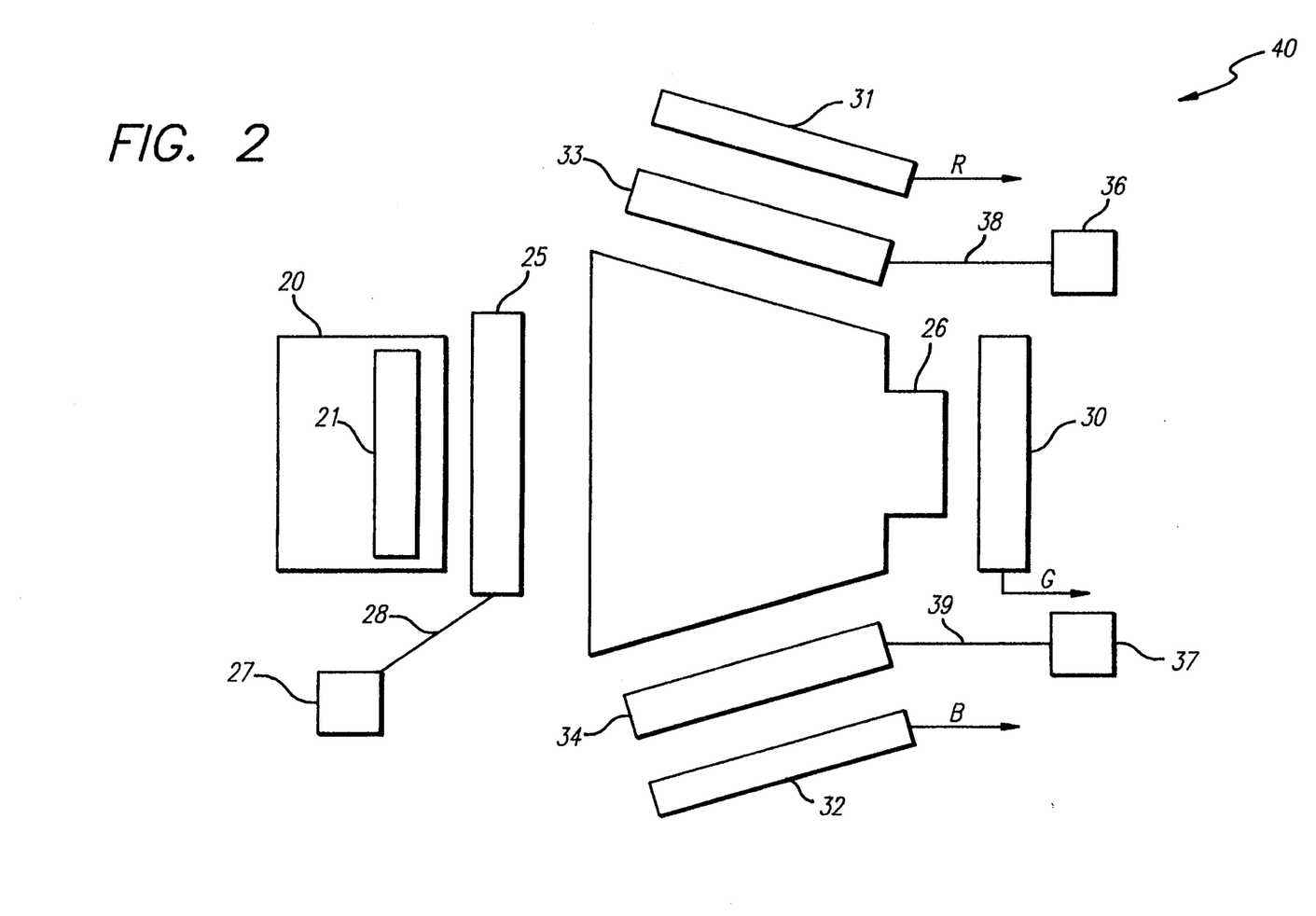
FIG. 2 illustrates a color video camera with electrochromic neutral density and electrochromic color correction filters.

An embodiment of a color video camera which employs electrochromic neutral density and color correction filters is depicted in FIG. 2. Light enters the video camera 40 through a taking lens 20 which is a zoom lens. Taking lens 20 contains an adjustable diameter aperture iris 21. Adjustment of the aperture of iris 21 varies the depth of field of the video camera 40. The diameter of the aperture of iris 21 can be varied over a virtually continuous range. The smaller the diameter of the aperture, the greater the depth of field of the video camera 40. However, for a given ambient light level, increasingly more light passes into the video camera 40 through iris 21 as the diameter of the aperture of iris 21 is increased.

Light from taking lens 20 passes through neutral density filter 25 and enters optical separator 26. Neutral density (ND) filter 25 is made of electrochromic glass, preferably the Gentex glass.

A direct current from ND filter power supply 27 is applied to the ND filter 25 over ND control line 28. Application of the current from ND filter power supply 27 will cause the ND filter 25 to darken, thereby reducing the amount of light which reaches optical separator 26. Conversely, reversing the current flow direction from ND filter power supply 27 will cause the ND filter 25 to lighten, thereby increasing the amount of light which reaches the optical separator 26. ND filter 25 is controlled and operates in the same manner as was described previously in connection with FIG. 1.

Continuing to refer to FIG. 2, Optical separator 26 divides the light which entered the video camera 40 into three component light paths, one for each primary color. Green light from optical separator 26 is detected by green sensor 30. Red light from optical separator 26 passes through red filter 33 and is detected by red sensor 31. Similarly, blue light from optical separator 26 passes through blue filter 34 and is detected by blue sensor 32. The red 31, green 30 and blue 32 sensors provide respective R, G and B signals which may be combined, in a manner well known in the art, to form a color television signal.

In the preferred embodiment of the present invention, red and blue filters 3334 are also constructed of electrochromic glass, preferably the Gentex glass. A direct current from red filter power supply 36 is applied to the red filter 33 over red control line 38. Application of the current from red filter power supply 36 will cause the red filter 33 to darken, thereby reducing the amount of red light which reaches red sensor 31. Conversely, reversing the current flow direction from red filter power supply 36 will cause the red filter 33 to lighten, thereby increasing the amount of red light which reaches the red sensor 31. A direct current from blue filter power supply 37 is applied to the blue filter 34 over blue control line 39. Application of the current from blue filter power supply 37 will cause the blue filter 34 to darken, thereby reducing the amount of blue light which reaches blue sensor 32. Conversely, reversing the current flow direction from blue filter power supply 37 will cause the blue filter 34 to lighten, thereby increasing the amount of blue light which reaches the blue sensor 32.

By controlling the transmission of light through red and blue filters 33–34, and hence the respective amount of red and blue light reaching red and blue sensors 31–32, the video camera operator can correct the color of the television signal to account for changes in target light levels which enter video camera 40. The present invention permits color correction without the need to physically substitute color correction filters. Therefore, conventional color correction filters and the color correction filter cassette can be eliminated from color video cameras. Also, as with electrochromic ND filters, electrochromic color correction filters can be adjusted to respond rapidly to changing light conditions and can be controlled over a virtually continuous range.

Control of the darkness of red and blue filters 33–34 could be achieved using the analog, digital or automatic methods described in FIG. 1 in connection with ND filter 25. For example, referring again to FIG. 2, a reference white card would be placed in front of video camera 40. The operator would then adjust iris 21 to provide the desired depth of field. Next, the lightness or darkness of ND filter 25 would be adjusted to provide a G video signal at the reference voltage level dictated by the desired video standard (e.g. 714 millivolts for NTSC). Then, the lightness or darkness of R and B filters 33–34 would be adjusted until the R and B video signals each matched the reference voltage level of the G video signal.

Alternately, a two-stage color correction scheme could be implemented. In a first stage, the red and blue filters 33–34 would make a gross color correction to bring the R and B video signal voltages close to that of the G video signal. Then, in a second stage, a conventional automatic gain control white balancing circuit would be employed to fine tune the color correction by amplifying or attenuating the R and B video signals until they matched the voltage of the G signal. In this way the electrochromic red and blue filters 33-34 would bring the R, G and B video signals into a range which is close enough that the automatic gain control white balancing circuitry would automatically balance the signals without introducing an unacceptable amount of noise into the video signals. It will be obvious to one skilled in the art that the wide range of transmittance of the electrochromic filters employed in the first stage of the color correction scheme would be superior to prior art color correction schemes. This is because, when using the present invention, there is no need to physically substitute conventional color filters to make a gross color correction as would be the case in the prior art scheme. Furthermore, in the prior art scheme, the proper color correction filter may not be available. Therefore, the automatic gain control white balancing circuit would not be able to correct color properly, or could do so only by introducing an unacceptable amount of noise by amplifying signals excessively to balance them.

Furthermore, the configuration of FIG. 2 may be undesirable in low light situations because red and blue light are filtered twice, once by ND filter 25 and once by red or blue filters 33-34, respectively. In an alternate embodiment, the double filtering can be eliminated by placing ND filter 25 between optical separator 26 and green sensor 30 and distributing the neutral density filter function among ND filter 25 and red and blue filters 33-34.

While the present invention has been particularly described with reference to FIGS. 1-2 and with emphasis on certain camera systems, it should be understood that the figures are for illustration purpose only and should not be taken as limitations upon the present invention. In addition, it is clear that the method and apparatus of the present invention has utility in any application where electro-optical control of light attenuation of an optical path is desired. It is contemplated that numerous alternatives, modifications, variations and uses may be made, by one skilled in the art, without departing from the spirit and scope of the invention as disclosed above.

What is claimed is:

1. In a camera comprising a taking lens for focusing light entering said camera, an optical sensor for receiving said light entering said camera, an iris, located between said taking lens and said optical sensor, said iris having an adjustable diameter aperture for restricting the amount of said light entering said camera and controlling depth of field, an apparatus for compensating for an increase or decrease in the amount of light entering said camera when said aperture diameter of said iris is changed to adjust said depth of field, said apparatus comprising:

an electrochromic neutral density (ND) filter, located between said iris and said taking lens; and ND control means coupled to said ND filter for applying a ND control current to said ND filter, said ND filter having a light transmission characteristic that is varied by applying said ND control current to said ND filter, such that the amount of light reaching said optical sensor may be maintained constant by darkening or lightening said ND filter.

2. The apparatus as set forth in claim 1 wherein said optical sensor comprises a light-sensitive chemical coating on a base surface.

3. The apparatus as set forth in claim 1 wherein said optical sensor converts said light into a video signal.

4. The apparatus as set forth in claim 1 wherein said ND control means comprises a ND control potentiometer coupled to the ND filter, output of said ND control potentiometer is varied to darken and lighten the ND filter and wherein an operator selects an amount of lightening or darkening of said ND filter by manually setting said ND control potentiometer.

5. The apparatus as set forth in claim 1 wherein an amount of lightening or darkening of said ND filter is controlled automatically by said ND control means.

6. The apparatus as set forth in claim 5 wherein said ND control means comprises a light sensor which measures the amount of light reaching said optical sensor and generates a value to cause the ND filter to proportionately change to maintain constant light output from the ND filter.

7. The apparatus as set forth in claim 5 wherein said ND control means measures the amount said iris is opened or closed and generates a value to cause the ND filter to proportionately change to maintain constant light output from the ND filter.

8. The apparatus as set forth in claim 3 wherein said camera further comprises:

an optical separator, located between said ND filter and said optical sensor, for separating said light entering said camera into red, green and blue light beams; and wherein said optical sensor comprises:

a red sensor which receives said red light beam from said optical separator and converts said red light beam into an R video signal;

a green sensor which receives said green light beam from said optical separator and converts said green light beam into a G video signal;

a blue sensor which receives said blue light beam from said optical separator and converts said blue light beam into a B video signal.

9. The apparatus as set forth in claim 8 further comprising:

an electrochromic red filter, located between said optical separator and said red sensor;

red light control means for applying a red light control current to said red filter, said red light control means coupled to said red filter, said red filter having a light transmission characteristic that is varied by applying said red light control current to said red light filter;

an electrochromic blue filter, located between said optical separator and said blue sensor;

blue light control means for applying a blue light control current to said blue filter, said blue light control means coupled to said blue filter, said blue filter having a light transmission characteristic that is varied by applying said blue light control current to said blue light filter;

such that the amount of red and blue light reaching said respective red and blue sensors may be adjusted by darkening or lightening said red and blue filters to compensate for a respective increase or decrease in the amount of light entering said camera, thereby providing color correction.

10. The apparatus as set forth in claim 9 wherein said blue light control means comprises a blue control potentiometer coupled to the blue filter, output of said blue control potentiometer is varied to darken and lighten the blue filter and said red light control means comprises a red control potentiometer coupled to the red filter, output of said red control potentiometer is varied to darken and lighten the red filter and wherein an operator selects an amount of lightening or darkening of said blue filter by manually setting said blue control potentiometer and said operator selects an amount of lightening or darkening of said red filter by manually setting said red control potentiometer.

11. The apparatus as set forth in claim 9 wherein an amount of lightening or darkening of said blue filter is controlled automatically by said blue light control means and an amount of lightening or darkening of said red filter is controlled automatically by said red light control means.

12. The apparatus as set forth in claim 11 wherein said red light control means is coupled to said red and green sensors and generates a first value to cause the red filter to change to make the R and G video signals have equal amplitude when said red light control means is in a white balancing mode and wherein said blue light control means is coupled to said blue and green sensors and generates a second value to cause the blue filter to change to make the B and G video signals have equal amplitude when said blue light control means is in said white balancing mode.

13. The apparatus as set forth in claim 9 wherein said ND filter is located between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

14. In a color video camera comprising a taking lens for focusing light entering said camera, an optical separator for separating said light entering said camera into red, green and blue light beams, a red sensor which receives said red light beam from said optical separator and converts said red light beam into an R video signal, a green sensor which receives said green light beam from said optical separator and converts said green light beam into a G video signal, a blue sensor which receives said blue light beam from said optical separator and converts said blue light beam into a B video signal, an apparatus for providing color correction comprising:
 an electrochromic red filter, located between said optical separator and said red sensor;
 red light control means for applying a red light control current to said red filter, said red light control means coupled to said red filter, said red filter having a light transmission characteristic that is varied by applying said red light control current to said red light filter;
 an electrochromic blue filter, located between said optical separator and said blue sensor;
 blue light control means for applying a blue light control current to said blue filter, said blue light control means coupled to said blue filter, said blue filter having a light transmission characteristic that is varied by applying said blue light control current to said blue light filter;
 such that the amount of red and blue light reaching said respective red and blue sensors may be adjusted by darkening or lightening said red and blue filters to compensate for a respective increase or decrease in the amount of light entering said color video camera, thereby providing color correction.

15. The apparatus as set forth in claim 14 wherein said blue light control means comprises a blue control potentiometer coupled to the blue filter, output of said blue control potentiometer is varied to darken and lighten the blue filter and said red light control means comprises a red control potentiometer coupled to the red filter, output of said red control potentiometer is varied to darken and lighten the red filter and wherein an operator selects an amount of lightening or darkening of said blue filter by manually setting said blue control potentiometer and said operator selects an amount of lightening or darkening of said red filter by manually setting said red control potentiometer.

16. The apparatus as set forth in claim 14 wherein an amount of lightening or darkening of said blue filter is controlled automatically by said blue light control means and an amount of lightening or darkening of said red filter is controlled automatically by said red light control means.

17. The apparatus as set forth in claim 16 wherein said red light control means is coupled to said red and green sensors and generates a first value to cause the red filter to change to make the R and G video signals have equal amplitude when said red light control means is in a white balancing mode and wherein said blue light control means is coupled to said blue and green sensors and generates a second value to cause the blue filter to change to make the B and G video signals have equal amplitude when said blue light control means is in said white balancing mode.

18. The apparatus as set forth in claim 14, wherein said color video camera further comprises:
 an iris, located between said taking lens and said optical separator, said iris having an adjustable diameter aperture for restricting the amount of said light entering said camera and controlling depth of field;
 an electrochromic neutral density (ND) filter, located between said iris and said optical separator;
 ND control means for applying a ND control current to said ND filter, said ND control means coupled to said ND filter, said ND filter having a light transmission characteristic that is varied by applying said ND control current to said ND filter such that the amount of light reaching said optical separator may be maintained constant by darkening or lightening said ND filter;
 whereby an increase or decrease in the amount of light entering said camera is compensated for when said aperture diameter of said iris is changed to adjust the depth of field.

19. The apparatus as set forth in claim 18 wherein said ND control means comprises a ND control potentiometer coupled to the ND filter, output of said ND control potentiometer is varied to darken and lighten the ND filter and wherein an operator selects an amount of lightening or darkening of said ND filter by manually setting said ND control potentiometer.

20. The apparatus as set forth in claim 18 wherein an amount of lightening or darkening of said ND filter is controlled automatically by said ND control means.

21. The apparatus as set forth in claim 18 wherein said ND filter is located between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

22. In a color video camera comprising a taking lens for focusing light entering said camera, an optical separator for separating said light entering said camera into red, green and blue light beams, an iris, located between said taking lens and said optical separator, said iris having an adjustable diameter aperture for restricting the amount of said light entering said camera and controlling depth of field, a red sensor which receives said red light beam from said optical separator and converts said red light beam into an R video signal, a green sensor which receives said green light beam from said optical separator and converts said green light beam into a G video signal, a blue sensor which receives said blue light beam from said optical separator and converts said blue light beam into a B video signal, an apparatus for controlling the amount of light reaching said red, green and blue sensors comprising:

an electrochromic neutral density (ND) filter, located between said iris and said optical separator;

ND control means for applying a ND control current to said ND filter, said ND control means coupled to said ND filter, said ND filter having a light transmission characteristic that is varied by applying said ND control current to said ND filter such that the amount of light reaching said optical separator may be maintained constant by darkening or lightening said ND filter, whereby an increase or decrease in the amount of light entering said camera is compensated for when said aperture diameter of said iris is changed to adjust said depth of field;

an electrochromic red filter, located between said optical separator and said red sensor;

red light control means for applying a red light control current to said red filter, said red light control means coupled to said red filter, said red filter having a light transmission characteristic that is varied by applying said red light control current to said red light filter;

an electrochromic blue filter, located between said optical separator and said blue sensor;

blue light control means for applying a blue light control current to said blue filter, said blue light control means coupled to said blue filter, said blue filter having a light transmission characteristic that is varied by applying said blue light control current to said blue light filter;

such that the amount of red and blue light reaching said respective red and blue sensors may be adjusted by darkening or lightening said red and blue filters to compensate for a respective increase or decrease in the amount of light entering said camera, thereby providing color correction.

23. The apparatus as set forth in claim 22 wherein said ND control means comprises a ND control potentiometer coupled to the ND filter, output of said ND control potentiometer is varied to darken and lighten the ND filter and wherein an operator selects an amount of lightening or darkening of said ND filter by manually setting said ND control potentiometer, said blue light control means comprises a blue control potentiometer coupled to the blue filter, output of said blue control potentiometer is varied to darken and lighten the blue filter and wherein the operator selects an amount of lightening or darkening of said blue filter by manually setting said blue control potentiometer, and said red light control means comprises a red control potentiometer coupled to the red filter, output of said red control potentiometer is varied to darken and lighten the red filter and wherein said operator selects an amount of lightening or darkening of said red filter by manually setting said red control potentiometer.

24. The apparatus as set forth in claim 22 wherein an amount of lightening or darkening of said ND filter is controlled automatically by said ND control means, an amount of lightening or darkening of said blue filter is controlled automatically by said blue light control means and an amount of lightening or darkening of said red filter is controlled automatically by said red light control means.

25. The apparatus as set forth in claim 22 wherein said ND filter is located between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

26. In a camera comprising a taking lens for focusing light entering said camera, an optical sensor for receiving said light entering said camera, an iris, located between said taking lens and said optical sensor, said iris having an adjustable diameter aperture for restricting the amount of said light entering said camera and controlling depth of field, a method for controlling the amount of light reaching said sensor comprising the steps of:

providing an electrochromic neutral density (ND) filter between said iris and said optical sensor, said ND filter having a light transmission characteristic that is varied by applying a ND control current to said ND filter;

if the diameter of said aperture of said iris is increased to decrease said depth of field, applying said ND control current to said ND filter to darken said ND filter and thereby decrease the amount of light reaching said optical sensor;

if the diameter of said aperture of said iris is decreased to increase said depth of field, applying said ND control current to said ND filter to lighten said ND filter and thereby increase the amount of light reaching said optical sensor;

such that the amount of light reaching said optical sensor may be maintained constant by darkening or lightening said ND filter as the diameter of the aperture increases or decreases, whereby an increase or decrease in the amount of light entering said camera is compensated for when said aperture diameter of said iris is changed to adjust said depth of field.

27. The method as set forth in claim 26 further comprising a step wherein an operator selects an amount of lightening or darkening of said ND filter by manually setting said ND control means.

28. The method as set forth in claim 26 further comprising a step wherein an amount of lightening or darkening of said ND filter is controlled automatically by said ND control means.

29. The method as set forth in claim 28, wherein said ND control means comprises a light sensor, and said method further comprises a step wherein said light sensor measures the amount of light reaching said optical sensor and generates a value to cause the ND filter to proportionately change to maintain constant light output from the ND filter.

30. The method as set forth in claim 28 further comprising a step wherein said ND control means measures the amount said iris is opened or closed and generates a value to cause the ND filter to proportionately change to maintain constant light output from the ND filter.

31. The method as set forth in claim 26 wherein said camera comprises an optical separator for separating said light entering said camera into red, green and blue light beams, said iris is located between said taking lens and said optical separator, said optical sensor comprises a red sensor which receives said red light beam from said optical separator and converts said red light beam into an R video signal, a green sensor which receives said green light beam from said optical separator and converts said green light beam into a G video signal, a blue sensor which receives said blue light beam from said optical separator and converts said blue light beam into a B video signal, the method further comprising the steps of:
   providing an electrochromic red filter between said optical separator and said red sensor, said red filter having a light transmission characteristic that is varied by applying a red light control current to said red light filter;
   providing an electrochromic blue filter between said optical separator and said blue sensor, said blue filter having a light transmission characteristic that is varied by applying a blue light control current to said blue light filter;
   if the amount of light entering said camera changes, applying said blue light control current to said blue light filter to lighten or darken said blue filters to control the amount of blue light which reaches said blue sensor and applying said red light control current to said red light filter to lighten or darken said red filter to control the amount of red light which reaches said red sensor;
   such that the amount of red and blue light reaching said respective red and blue sensors may be adjusted by darkening or lightening said red and blue filters to compensate for a respective increase or decrease in the amount of light entering said camera, thereby providing color correction.

32. The method as set forth in claim 31 further comprising steps wherein:
   an operator selects an amount of lightening or darkening of said blue filter by manually setting said blue light control means; and
   said operator selects an amount of lightening or darkening of said red filter by manually setting said red light control means.

33. The method as set forth in claim 31 further comprising steps wherein:
   an amount of lightening or darkening of said blue filter is controlled automatically by said blue light control means; and
   an amount of lightening or darkening of said red filter is controlled automatically by said red light control means.

34. The method as set forth in claim 31 wherein the ND filter is provided between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

35. A camera comprising:
   a taking lens for focusing light entering said camera;
   an optical sensor for receiving said light entering said camera and for converting said light into a video signal;
   an iris, located between said taking lens and said optical sensor, said iris having an adjustable diameter aperture for restricting the amount of said light entering said camera and controlling depth of field; and
   an apparatus for compensating for an increase or decrease in the amount of light entering said camera when said aperture diameter of said iris is changed to adjust said depth of field, said apparatus comprising:
   an electrochromic neutral density (ND) filter, located between said iris and said optical sensor; and
   ND control means coupled to said ND filter for applying a ND control current to said ND filter, said ND filter having a light transmission characteristic that is varied by applying said ND control current to said ND filter, such that the amount of light reaching said optical sensor may be maintained constant by darkening or lightening said ND filter.

36. The camera as set forth in claim 35 wherein said ND filter is located between said iris and said taking lens.

37. The camera as set forth in claim 35 wherein said taking lens is located between said iris and said ND filter.

38. The camera as set forth in claim 35 wherein said ND control means comprises a ND control potentiometer coupled to the ND filter, output of said ND control potentiometer is varied to darken and lighten the ND filter and wherein an operator selects an amount of lightening or darkening of said ND filter by manually setting said ND control potentiometer.

39. The camera as set forth in claim 35 wherein an amount of lightening or darkening of said ND filter is controlled automatically by said ND control means.

40. The camera as set forth in claim 35 wherein said camera further comprises:
   an optical separator, located between said ND filter and said optical sensor, for separating said light entering said camera into red, green and blue light beams; and wherein said optical sensor comprises:
   a red sensor which receives said red light beam from said optical separator and converts said red light beam into an R video signal;
   a green sensor which receives said green light beam from said optical separator and converts said green light beam into a G video signal;
   a blue sensor which receives said blue light beam from said optical separator and converts said blue light beam into a B video signal.

41. The camera as set forth in claim 40 further comprising:
an electrochromic red filter, located between said optical separator and said red sensor;
red light control means for applying a red light control current to said red filter, said red light control means coupled to said red filter, said red filter having a light transmission characteristic that is varied by applying said red light control current to said red light filter;
an electrochromic blue filter, located between said optical separator and said blue sensor;
blue light control means for applying a blue light control current to said blue filter, said blue light control means coupled to said blue filter, said blue filter having a light transmission characteristic that is varied by applying said blue light control current to said blue light filter;
such that the amount of red and blue light reaching said respective red and blue sensors may be adjusted by darkening or lightening said red and blue filters to compensate for a respective increase or decrease in the amount of light entering said camera, thereby providing color correction.

42. The camera as set forth in claim 41 wherein said blue light control means comprises a blue control potentiometer coupled to the blue filter, output of said blue control potentiometer is varied to darken and lighten the blue filter and said red light control means comprises a red control potentiometer coupled to the red filter, output of said red control potentiometer is varied to darken and lighten the red filter and wherein an operator selects an amount of lightening or darkening of said blue filter by manually setting said blue control potentiometer and said operator selects an amount of lightening or darkening of said red filter by manually setting said red control potentiometer.

43. The camera as set forth in claim 41 wherein an amount of lightening or darkening of said blue filter is controlled automatically by said blue light control means and an amount of lightening or darkening of said red filter is controlled automatically by said red light control means.

44. The camera as set forth in claim 43 wherein said red light control means is coupled to said red and green sensors and generates a first value to cause the red filter to change to make the R and G video signals have equal amplitude when said red light control means is in a white balancing mode and wherein said blue light control means is coupled to said blue and green sensors and generates a second value to cause the blue filter to change to make the B and G video signals have equal amplitude when said blue light control means is in said white balancing mode.

45. The camera as set forth in claim 41 wherein said ND filter is located between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

46. In a camera comprising a taking lens for focusing light entering said camera, an optical sensor for receiving said light entering said camera, an iris, located between said taking lens and said optical sensor, said iris having an adjustable diameter aperture for restricting the amount of said light entering said camera and controlling depth of field, an apparatus for compensating for an increase or decrease in the amount of light entering said camera when said aperture diameter of said iris is changed to adjust said depth of field, said apparatus comprising:
an electrochromic neutral density (ND) filter, located between said iris and said optical sensor; and
ND control means coupled to said ND filter for applying a ND control current to said ND filter, said ND filter having a light transmission characteristic that is varied by applying said ND control current to said ND filter, said ND control means comprising a light sensor which measures the amount of light reaching said optical sensor and generates a value to cause the ND filter to proportionately change to maintain constant light output from the ND filter such that an amount of lightening or darkening of said ND filter is controlled automatically by said ND control means and the amount of light reaching said optical sensor may be maintained constant by darkening or lightening said ND filter.

47. The apparatus as set forth in claim 46 wherein said taking lens is located between said iris and said ND filter.

48. The apparatus as set forth in claim 46 wherein said optical sensor comprises a light-sensitive chemical coating on a base surface.

49. The apparatus as set forth in claim 46 wherein said optical sensor converts said light into a video signal.

50. The apparatus as set forth in claim 49 wherein said camera further comprises:
an optical separator, located between said ND filter and said optical sensor, for separating said light entering said camera into red, green and blue light beams; and wherein said optical sensor comprises:
a red sensor which receives said red light beam from said optical separator and converts said red light beam into an R video signal;
a green sensor which receives said green light beam from said optical separator and converts said green light beam into a G video signal;
a blue sensor which receives said blue light beam from said optical separator and converts said blue light beam into a B video signal.

51. The apparatus as set forth in claim 50 further comprising:
an electrochromic red filter, located between said optical separator and said red sensor;
red light control means for applying a red light control current to said red filter, said red light control means coupled to said red filter, said red filter having a light transmission characteristic that is varied by applying said red light control current to said red light filter;
an electrochromic blue filter, located between said optical separator and said blue sensor;
blue light control means for applying a blue light control current to said blue filter, said blue light control means coupled to said blue filter, said blue filter having a light transmission characteristic that is varied by applying said blue light control current to said blue light filter;
such that the amount of red and blue light reaching said respective red and blue sensors may be adjusted by darkening or lightening said red and blue filters to compensate for a respective increase or decrease in the amount of light entering said camera, thereby providing color correction.

52. The apparatus as set forth in claim 51 wherein said blue light control means comprises a blue control potentiometer coupled to the blue filter, output of said blue control potentiometer is varied to darken and lighten the blue filter and said red light control means comprises a red control potentiometer coupled to the red filter, output of said red control potentiometer is varied to darken and lighten the red filter and wherein an operator selects an amount of lightening or darkening of said blue filter by manually setting said blue control potentiometer and said operator selects an amount of lightening or darkening of said red filter by manually setting said red control potentiometer.

53. The apparatus as set forth in claim 51 wherein an amount of lightening or darkening of said blue filter is controlled automatically by said blue light control means and an amount of lightening or darkening of said red filter is controlled automatically by said red light control means.

54. The apparatus as set forth in claim 53 wherein said red light control means is coupled to said red and green sensors and generates a first value to cause the red filter to change to make the R and G video signals have equal amplitude when said red light control means is in a white balancing mode and wherein said blue light control means is coupled to said blue and green sensors and generates a second value to cause the blue filter to change to make the B and G video signals have equal amplitude when said blue light control means is in said white balancing mode.

55. The apparatus as set forth in claim 51 wherein said ND filter is located between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

56. In a camera comprising a taking lens for focusing light entering said camera, an optical sensor for receiving said light entering said camera, an iris, located between said taking lens and said optical sensor, said iris having an adjustable diameter aperture for restricting the amount of said light entering said camera and controlling depth of field, an apparatus for compensating for an increase or decrease in the amount of light entering said camera when said aperture diameter of said iris is changed to adjust said depth of field, said apparatus comprising:

an electrochromic neutral density (ND) filter, located between said iris and said optical sensor; and ND control means coupled to said ND filter for applying a ND control current to said ND filter, said ND filter having a light transmission characteristic that is varied by applying said ND control current to said ND filter, an amount of lightening or darkening of said ND filter being controlled automatically by said ND control means such that the amount of light reaching said optical sensor may be maintained constant by darkening or lightening said ND filter.

ND control means coupled to said ND filter for applying a ND control current to said ND filter, said ND filter having a light transmission characteristic that is varied by applying said ND control current to said ND filter, said ND control means measures the amount said iris is opened or closed and generates a value to cause the ND filter to proportionately change to maintain constant light output from the ND filter such that an amount of lightening or darkening of said ND filter is controlled automatically by said ND control means and the amount of light reaching said optical sensor may be maintained constant by darkening or lightening said ND filter.

57. The apparatus as set forth in claim 56 wherein said taking lens is located between said iris and said ND filter.

58. The apparatus as set forth in claim 56 wherein said optical sensor comprises a light-sensitive chemical coating on a base surface.

59. The apparatus as set forth in claim 56 wherein said optical sensor converts said light into a video signal.

60. The apparatus as set forth in claim 56 wherein said camera further comprises:

an optical separator, located between said ND filter and said optical sensor, for separating said light entering said camera into red, green and blue light beams; and wherein said optical sensor comprises:

a red sensor which receives said red light beam from said optical separator and converts said red light beam into an R video signal;

a green sensor which receives said green light beam from said optical separator and converts said green light beam into a G video signal;

a blue sensor which receives said blue light beam from said optical separator and converts said blue light beam into a B video signal.

61. The apparatus as set forth in claim 60 further comprising:

an electrochromic red filter, located between said optical separator and said red sensor;

red light control means for applying a red light control current to said red filter, said red light control means coupled to said red filter, said red filter having a light transmission characteristic that is varied by applying said red light control current to said red light filter;

an electrochromic blue filter, located between said optical separator and said blue sensor;

blue light control means for applying a blue light control current to said blue filter, said blue light control means coupled, to said blue filter, said blue filter having a light transmission characteristic that is varied by applying said blue light control current to said blue light filter;

such that the amount of red and blue light reaching said respective red and blue sensors may be adjusted by darkening or lightening said red and blue filters to compensate for a respective increase or decrease in the amount of light entering said camera, thereby providing color correction.

62. The apparatus as set forth in claim 61 wherein said blue light control means comprises a blue control potentiometer coupled to the blue filter, output of said blue control potentiometer is varied to darken and lighten the blue filter and said red light control means comprises a red control potentiometer coupled to the red filter, output of said red control potentiometer is varied to darken and lighten the red filter and wherein an operator selects an amount of lightening or darkening of said blue filter by manually setting said blue control potentiometer and said operator selects an amount of lightening or darkening of said red filter by manually setting said red control potentiometer.

63. The apparatus as set forth in claim 61 wherein an amount of lightening or darkening of said blue filter is controlled automatically by said blue light control means and an amount of lightening or darkening of said red filter is controlled automatically by said red light control means.

64. The apparatus as set forth in claim 63 wherein said red light control means is coupled to said red and green sensors and generates a first value to cause the red filter to change to make the R and G video signals have equal amplitude when said red light control means is in a white balancing mode and wherein said blue light control means is coupled to said blue and green sensors and generates a second value to cause the blue filter to change to make the B and G video signals have equal amplitude when said blue light control means is in said white balancing mode.

65. The apparatus as set forth in claim 61 wherein said ND filter is located between said optical separator and said green sensor, said ND filter lightens or darkens to control the amount of light reaching said green sensor, said electrochromic red filter lightens or darkens to control the amount of light reaching said red sensor, and said electrochromic blue filter lightens or darkens to control the amount of light reaching said blue sensor, such that said ND, red and blue filters cooperate to compensate for the increase or decrease in the amount of light entering said camera.

* * * * *